2,271,124

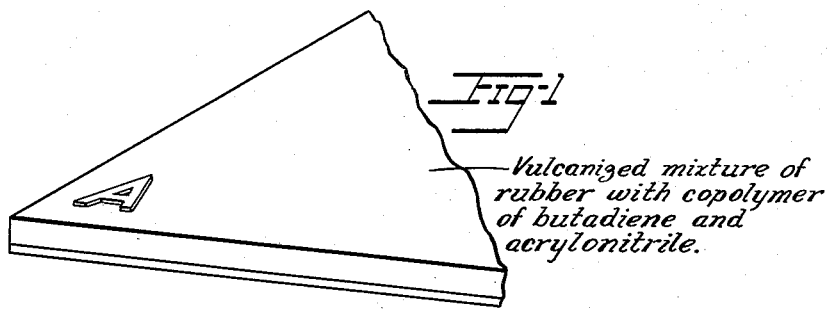
Fig-1 — Vulcanized mixture of rubber with copolymer of butadiene and acrylonitrile.
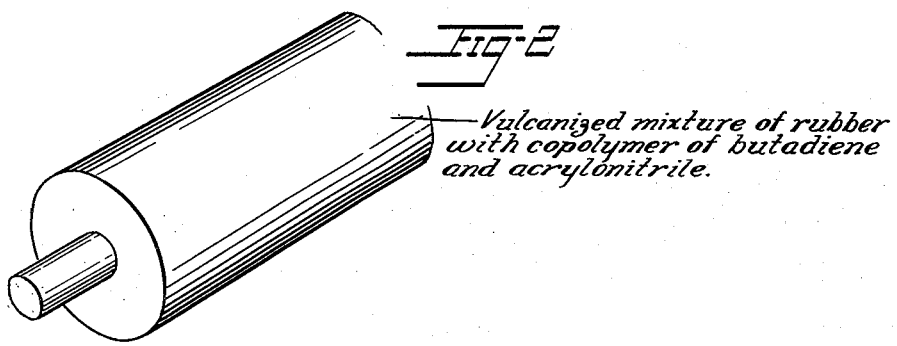
Fig-2 — Vulcanized mixture of rubber with copolymer of butadiene and acrylonitrile.
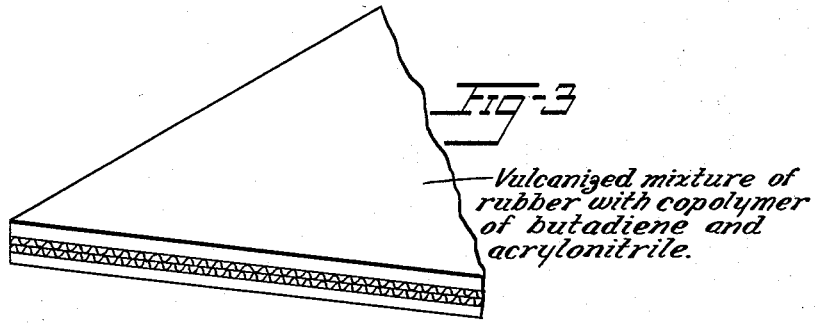
Fig-3 — Vulcanized mixture of rubber with copolymer of butadiene and acrylonitrile.
Inventors
Arthur E. Juve
Benjamin S. Garvey Patented Jan. 27, 1942

UNITED STATES PATENT OFFICE 2,271,124

ARTICLE SUBJECTED TO PRINTING INK

Arthur E. Juve and Benjamin S. Garvey, Akron, Ohio, assignors to The B. F. Goodrich Company, New York, N. Y., a corporation of New York Application August 3, 1940, Serial No. 351,174

6 Claims. (Cl. 91—67.8)

This invention relates to articles which are subjected, when in use, to the action of printing inks.

It is well known that many printing inks have a deleterious effect on soft vulcanized natural rubber. When natural rubber is employed for the surfaces of offset printing blankets, or for engraving or printing gum, the articles have a rather short life due to the development of a tacky surface. The surfaces of printing rolls made of rubber rapidly become soft and tender due to the action of many common printing inks. Although much work has been done in the attempt to develop inks which do not affect rubber, the most satisfactory inks for many purposes still rapidly deteriorate rubber surfaces when they come in contact therewith.

It has been proposed to substitute for the rubber surfaces which are subjected to the action of printing ink synthetic rubbers, many of which are more resistant to the action of the oils and solvents ordinarily used in printing inks than rubber. These synthetic materials have, however, been found to possess disadvantages which often outweighed the advantages gained through their resistance to swelling. Many synthetic rubber surfaces, for instance, are not properly wet by printing inks. Instead of spreading over the surfaces in a thin, uniform film, the ink has a tendency to form in droplets.

We have now discovered that satisfactory surfaces for use in contact with printing inks may be prepared by vulcanizing a mixture of rubber and a copolymer of butadiene and acrylonitrile. Such surfaces are not only much more resistant to the action of printing inks than those made of soft vulcanized rubber, but are better wet by printing inks than surfaces made of the vulcanized copolymer alone. These vulcanized mixtures of rubber and copolymer may be employed as the sole resilient element in printing rolls, offset printing blankets, engraving gums, printing gums, etc., or they may be used only as a surfacing material to protect or to impart better wetting properties to previously known structures.

In the accompanying drawing, Fig. 1 shows a portion of a printing plate having a surface of a vulcanized mixture of rubber with a copolymer of butadiene and acrylonitrile, Fig. 2 shows a portion of a printing roll with a surface of the same material, and Fig. 3 shows a portion of an offset printing blanket again having a surface of the same material.

It is known that oil-resisting copolymers may be prepared by copolymerizing butadiene and acrylonitrile in a large range of proportions, the most useful copolymers being formed from mixtures ranging in composition from about 80 parts of butadiene and 20 parts of acrylonitrile to equal parts of butadiene and acrylonitrile, the amounts of ingredients throughout the specification and claims being measured by weight. Specific preferred copolymers within this range include those formed by copolymerizing mixtures of about 75 parts of butadiene and 25 parts of acrylonitrile, 65 parts of butadiene and 35 parts of acrylonitrile, and 55 parts of butadiene and 45 parts of acrylonitrile.

The proportions in which the rubber and copolymer are combined to form a suitable material for making an article to be subjected to printing ink depends upon several factors including the particular copolymer employed and the nature of the printing ink. In general, it may be stated that the higher the proportion of acrylonitrile present in the mixture from which the copolymer is prepared, the smaller will be the proportion of copolymer employed with the rubber. To resist many ordinary printing inks, mixtures containing as plastic ingredients between 20 and 30 parts of rubber and between 80 and 70 parts of a copolymer of a mixture of 75 parts of butadiene and 25 parts of acrylonitrile have proven highly satisfactory. Wherever greater resistance to swelling is required, mixtures containing as high as 90 parts of the copolymer to 10 parts of rubber may be employed, but as the proportion of copolymer is further increased, the advantage of increased oil-resistance is offset by the impairment of the wetting properties of the composition.

When a copolymer made from a mixture of 55 parts of butadiene and 45 parts of acrylonitrile is employed, considerably higher proportions of rubber may be present. Thus a mixture of roughly equal parts of rubber and this copolymer has about the same resistance to printing ink as the compositions containing about 30 parts of rubber and 70 parts of 75-25 copolymer, mentioned above.

These mixtures of rubber and copolymer may be compounded and vulcanized in the same manner as natural rubber. By employing the ordinary rubber techniques, compositions having a wide range of physical properties may be prepared, it being kept in mind that the copolymers in general require more softening and plasticizing agents than natural rubber. Substantial proportions, such as from 20%–50% or more based on the plastic ingredients, of reinforcing pigments such as carbon black, blanc fixe, fine clay, reinforcing calcium carbonate, etc., should be employed so that compositions having low permanent set will be formed. By following well-known rubber compounding principles, articles of manufacture with the desired physical characteristics in addition to resistance to printing ink and good wetting characteristics may be prepared.

As illustrations of the invention, the following specific examples show recipes for compositions useful in the manufacture of specific articles of manufacture subjected to the action of printing inks.

*Example I.*—To make engraving gum, the following composition was prepared:

| | Parts by weight |
|---|---|
| Perbunan* | 75 |
| Rubber | 25 |
| Sulfur | 2 |
| Accelerator | 1.5 |
| Soft carbon black | 50 |
| Zinc oxide | 5 |
| Softeners | 38 |

*A commercially-available synthetic rubber believed to be a copolymer of approximately 75 parts of butadiene and 25 parts of acrylonitrile.

The accelerator may suitably be a thiazole-type material such as 2-mercaptobenzothiazole, 2-mercapto 4,5-dimethylthiazole, etc. The softener may suitably consist of a major proportion of butyl acetyl ricinoleate, dibenzyl ether, triphenyl phosphate, dibutyl phthalate or other well known softener for the copolymer and a minor proportion of rosin oil, cottonseed oil, lauric acid, or other well known softener for rubber. This composition may be vulcanized to form printing plates, engraving plates, etc., as is shown in Fig. 1, which have the property of becoming covered with a uniform thin film of ink in a satisfactory manner, as well as having excellent resistance to printing inks, and producing sharp impressions even after being used for long periods of time.

*Example II.*—The following composition was prepared:

| | Parts by weight |
|---|---|
| Perbunan | 80 |
| Rubber | 20 |
| Accelerator | 2 |
| Sulfur | 3 |
| Carbon black | 25 |
| Cumar resin | 40 |
| Softeners | 60 |

This composition when adherently vulcanized around metal rod formed an excellent printing roller, as is shown in Fig. 2.

*Example III.*—The following composition was prepared:

| | Parts by weight |
|---|---|
| Perbunan | 80 |
| Rubber | 20 |
| Sulfur | 2 |
| Accelerator | 1.5 |
| Carbon black | 40 |
| Zinc oxide | 5 |
| Lauric acid | 1.5 |
| Softener for Perbunan | 40 |

This composition was dissolved in a solvent, spread as the surface layer on an offset printing blanket, as is shown in Fig. 3, and vulcanized. The resulting blanket was employed to print with an ink which soon deteriorated rubber blankets, and was found to possess a surface which is easily wet with the ink, and which lasted a long time, even when employed in high speed printing operations.

*Example IV.*—Another composition suitable for a surfacing material for offset printing blankets contained the following ingredients:

| | Parts by weight |
|---|---|
| Copolymer of a mixture of 55 parts of butadiene and 45 parts of acrylonitrile | 53 |
| Rubber | 47 |
| Sulfur | 2 |
| Accelerator | 1.5 |
| Carbon black | 40 |
| Lauric acid | 1.5 |
| Softener for copolymer | 40 |

This composition was employed like the composition of Example III to make an excellent printing blanket.

Although we have herein disclosed specific embodiments of our invention, we do not intend to limit the invention solely thereto, for it will be obvious to those skilled in the art that many modifications such as substituting equivalent materials and varying the proportions of materials used are within the spirit and scope of the invention as defined in the appended claims.

We claim:

1. An article of manufacture which is subjected in use to the action of printing ink, said article having a surface composed of a vulcanized mixture of rubber and a copolymer of butadiene and acrylonitrile.

2. An article of manufacture which is subjected in use to the action of printing ink, said article having a surface composed of a vulcanized mixture of rubber and a copolymer of butadiene and acrylonitrile, the rubber constituting not more than 50% and the copolymer constituting not less than 50% of the plastic ingredients in the composition.

3. An article of manufacture which is subjected in use to the action of printing ink, said article having a surface composed of a vulcanized mixture of rubber and a copolymer of a mixture of about 55 parts of butadiene and 45 parts of acrylonitrile, the rubber and copolymer being present in roughly equal proportions.

4. An article of manufacture which is subjected in use to the action of printing ink, said article having a surface composed of a vulcanized mixture of rubber and copolymer of a mixture of about 75 parts of butadiene and 25 parts of acrylonitrile, the rubber constituting from 30–20% of the plastic ingredients and the copolymer constituting from 70–80% of the plastic ingredients in the composition.

5. A printing roll having a surface composed of a vulcanized mixture of rubber and a copolymer of butadiene and acrylonitrile.

6. A printing roll having a surface composed of a vulcanized mixture of rubber and a copolymer of a mixture of about 75 parts of butadiene and 25 parts of acrylonitrile.

ARTHUR E. JUVE.
BENJAMIN S. GARVEY.